Dec. 9, 1947.  H. F. MAY  2,432,324
REGISTERING SYSTEM
Filed Aug. 9, 1940  7 Sheets-Sheet 1

INVENTOR
H. F. MAY
BY *J. F. Presson*
ATTORNEY

Dec. 9, 1947.  H. F. MAY  2,432,324
REGISTERING SYSTEM
Filed Aug. 9, 1940  7 Sheets—Sheet 4

FIG. 5

INVENTOR
H. F. MAY
BY
ATTORNEY

Dec. 9, 1947.  H. F. MAY  2,432,324
REGISTERING SYSTEM
Filed Aug. 9, 1940  7 Sheets-Sheet 5

FIG. 6

INVENTOR
H. F. MAY
BY
ATTORNEY

Dec. 9, 1947.  H. F. MAY  2,432,324
REGISTERING SYSTEM
Filed Aug. 9, 1940  7 Sheets-Sheet 6

FIG. 7

INVENTOR
H. F. MAY
BY
ATTORNEY

FIG. 8

Patented Dec. 9, 1947

2,432,324

UNITED STATES PATENT OFFICE 2,432,324

REGISTERING SYSTEM

Harold F. May, Valley Stream, N. Y., assignor to The Teleregister Corporation, New York, N. Y., a corporation of Delaware Application August 9, 1940, Serial No. 351,924

4 Claims. (Cl. 235—61)

This invention relates to a registering system and more particularly to a system for registering information such as accounting or taking an inventory of a stock of rapidly changing items in a department store or the like, wherein the stock of items may be varied at a relatively rapid rate. The invention is also adapted for use in brokerage offices, such for example, as odd lot houses wherein orders for less than one hundred shares of stock are received and executed by the broker and the buy and sell orders are registered in tabular form and classified according to the number of shares of stocks involved in the transaction, the total amount of the sale and the customer's account or identification designation. The present invention may also be employed for other purposes, such as registering the items of production in a manufacturing plant or the number of bets at racing and other sports events wherein the total number of items of operation of different classes is automatically totaled and posted in tabular form.

An object of this invention is to provide an improved system of the character described wherein messages originating at a main station are transmitted selectively to a plurality of receiving devices and posted by the receiving devices in accordance with the combined values of the messages previously posted by the devices and the algebraic value of the messages received.

In general, this system provides an arrangement whereby an operator at a station, located, for example, at a cashier's desk or clerk's counter within a department store, actuates the keys of a key set thereby effecting registration of the sale of items classified in any desired manner according to style, size, color or the like, thereby effecting a totalizing operation of the system whereby the number of items of a particular class remaining in stock after a transaction has been completed is automatically posted on an individual inventory board and on a group inventory display board. The individual inventory display board may be remotely situated from the key set as, for example, within the storeroom where it would be continuously visible to inventory clerks who would thus be apprised of the amount of stock on hand of the different items classified according to certain characteristics of the individual items, and also according to the groups of the items. The system of the present invention thus enables the inventory clerk to be continuously apprised of the amount of stock of each of the items on hand whereby a small amount of stock is sufficient to enable the store to render satisfactory deliveries regardless of the sales activity of a particular item, for the reason that the inventory clerk, upon observing that the supply of stock of a particular item is running low, is immediately advised of this condition and thus may issue instructions that the stock of certain of the items should be replenished.

As each item is replenished the clerk or cashier is advised of the number of each of the items added to the stock whereupon the clerk or cashier, as the case may be, operates the keys of his key set to add the replished items to the number of items posted on the individual and group inventory boards, the addition being accomplished automatically and the totals of items previously posted and the items added are posted on the individual and group inventory boards. As sales of each item are made the key set is operated to effect a subtraction of the number of items comprising each sale from the number of items in stock classified according to style and size of the items whereupon the subtraction is automatically accomplished by the operation of the system and the number of items of each class remaining in stock after each subtraction operation has been effected is posted on the individual and group inventory boards. The system thus provides an arrangement whereby a running inventory is continuously maintained of the number of items of each size and color on hand.

The group inventory board is employed for indicating the number of items in stock, classified according to desired characteristics such, for example, as size, color or model. The information posted on the group inventory board enables the buyer to ascertain at any time whether a particular group of items is being carried by the store at a sufficient profit to warrant continuance of these items or whether the public demand for an item which may have been placed on sale at a reduced price, for example, is sufficiently great to warrant contiuance of the sale. In the case of items grouped according to styles, for example, the group inventory board enables the buyer to ascertain at all times the demand for items of a particular style.

Another of the objects of the invention is the provision of improved means for transmitting signals representative of the value of a number and causing this number to be subtracted from the number previously posted by a selected device and the number remaining after the subtraction operation has been effected to be automatically posted by the device.

A further object resides in the arrangement of simplified and improved apparatus and circuits therefor for causing a number set up at a transmitting station to be combined with a number posted by an indicating device in accordance with the algebraic value of the number set up at the transmitting station and the combined number to be posted by the indicating device by impulses controlled from the transmitting station.

A further object of the invention is the provision of a system for automatically subtracting numerical values set up at a transmitting station from a plurality of numbers set up at a plurality of receiving indicating devices representing different numerical values and concurrently posting the new numbers thus formed on the receiving devices.

A still further object of the invention resides in the provision of means for simultaneously selecting a plurality of indicating devices having different numerical values set up thereon and for varying the numerical values of the selected devices by a predetermined amount to higher or lower values, as the case may be, by a single operation of the transmitting apparatus at a sending station.

Still another object of the invention resides in a system for adding or subtracting numerical values wherein the values are displayed by indicators of a conventional construction heretofore extensively employed in stock quotation systems, and which have a greater number of display positions than those required for posting the information transmitted in the present system, thereby enabling such indicators to be used in the present system and obviating the necessity of providing special indicators for this purpose.

With these and other objects in view, which will become apparent from the following description of one illustrative embodiment of the invention shown on the accompanying drawings, the invention resides in the novel system, elements of construction, devices and combination of parts in cooperative relationship, as hereinafter more particularly pointed out in the claims. Referring now to the drawings in which like numerals of reference are employed to designate like parts throughout the several views.

Description of keyset

Figure 1:
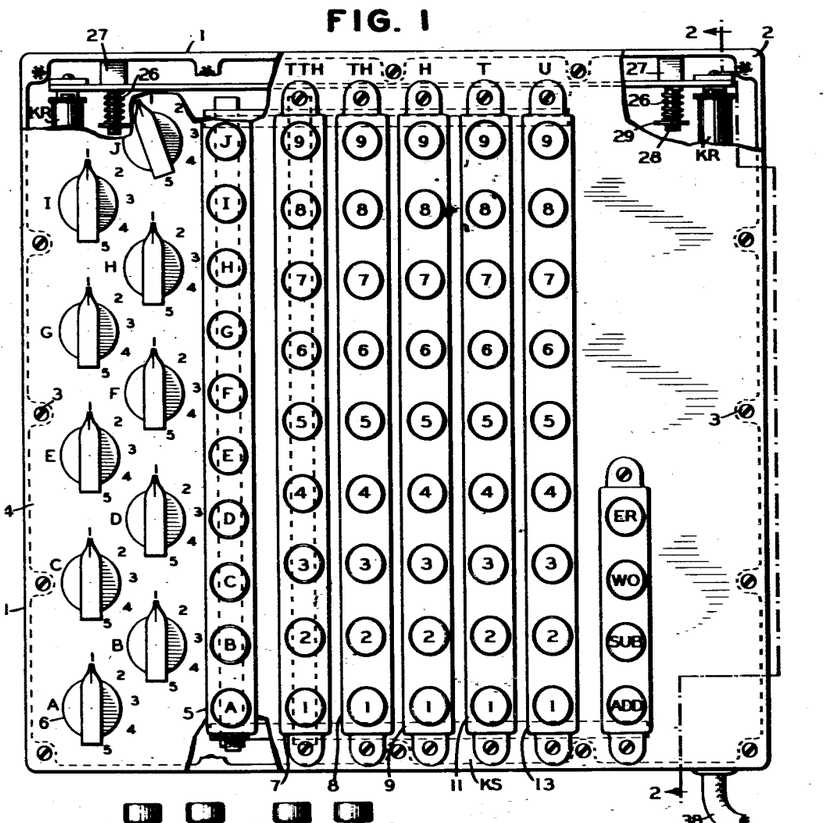
Fig. 1 shows certain transmitting apparatus suitable for use with the system.
Figure 2:
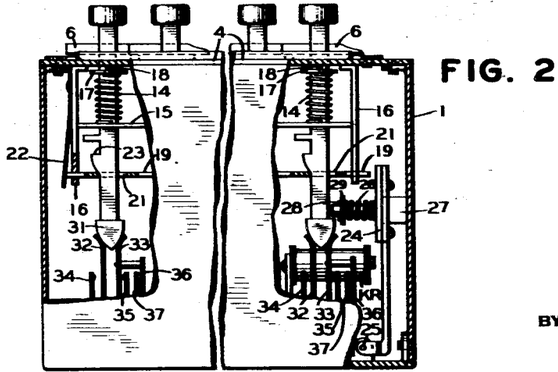
Fig. 2 is a view taken along the line 2—2 of Fig. 1.
Figure 3:
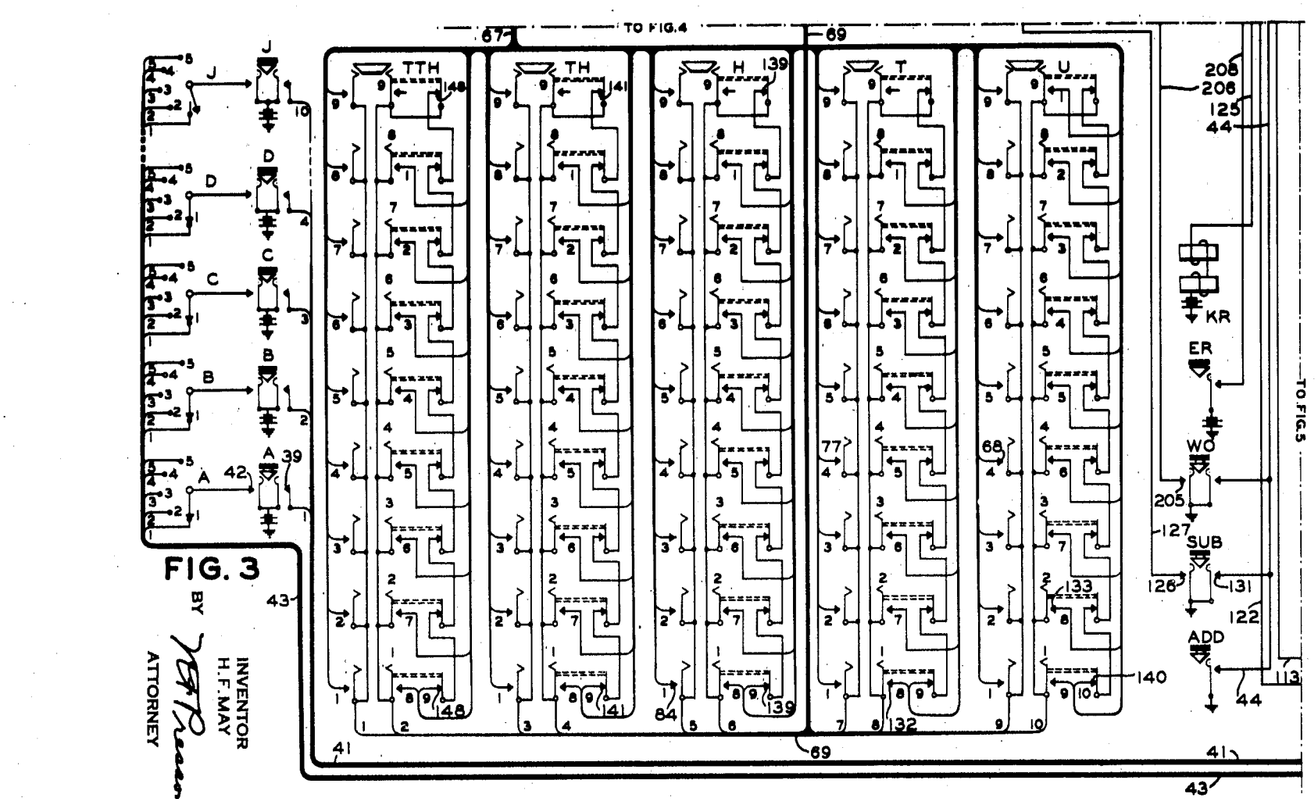
Fig. 3 shows, in diagrammatic form, the transmitting apparatus of Fig. 1.
Figure 4:
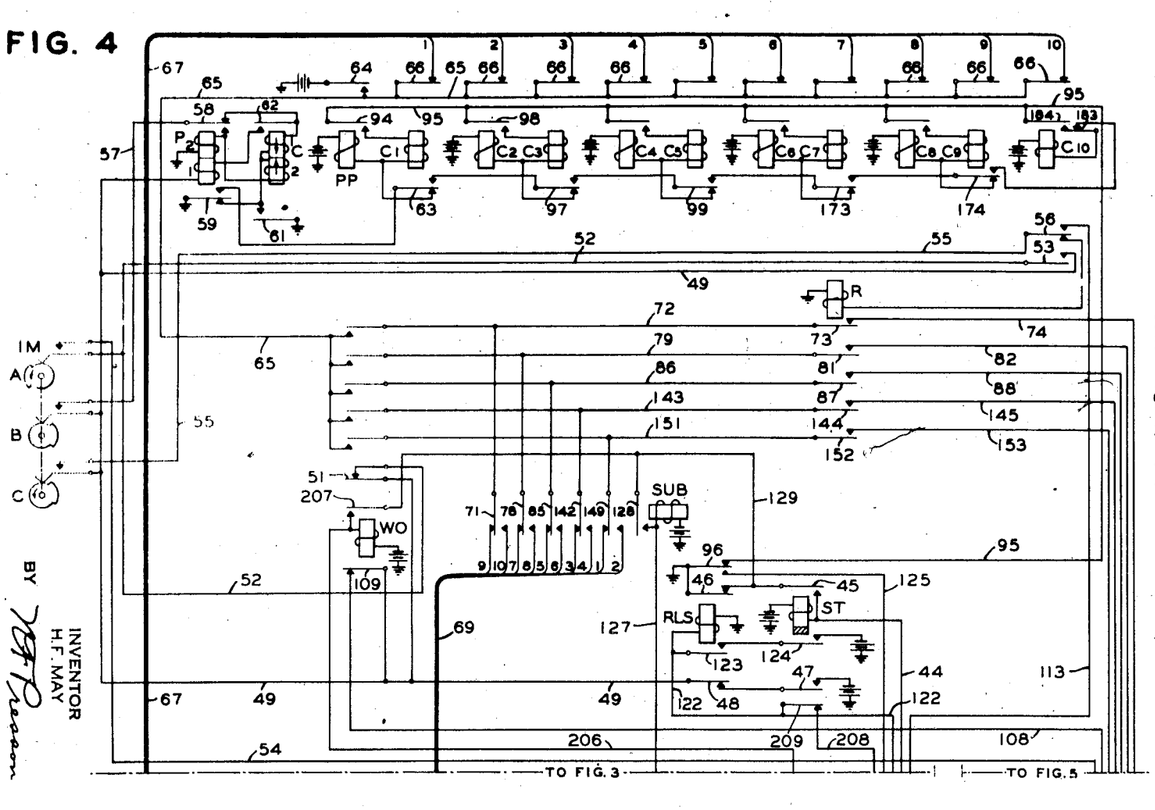
Fig. 4 shows, in diagrammatic form, certain transmitting and control apparatus operatively connected to the transmitting apparatus of Fig. 3.
Figure 5:
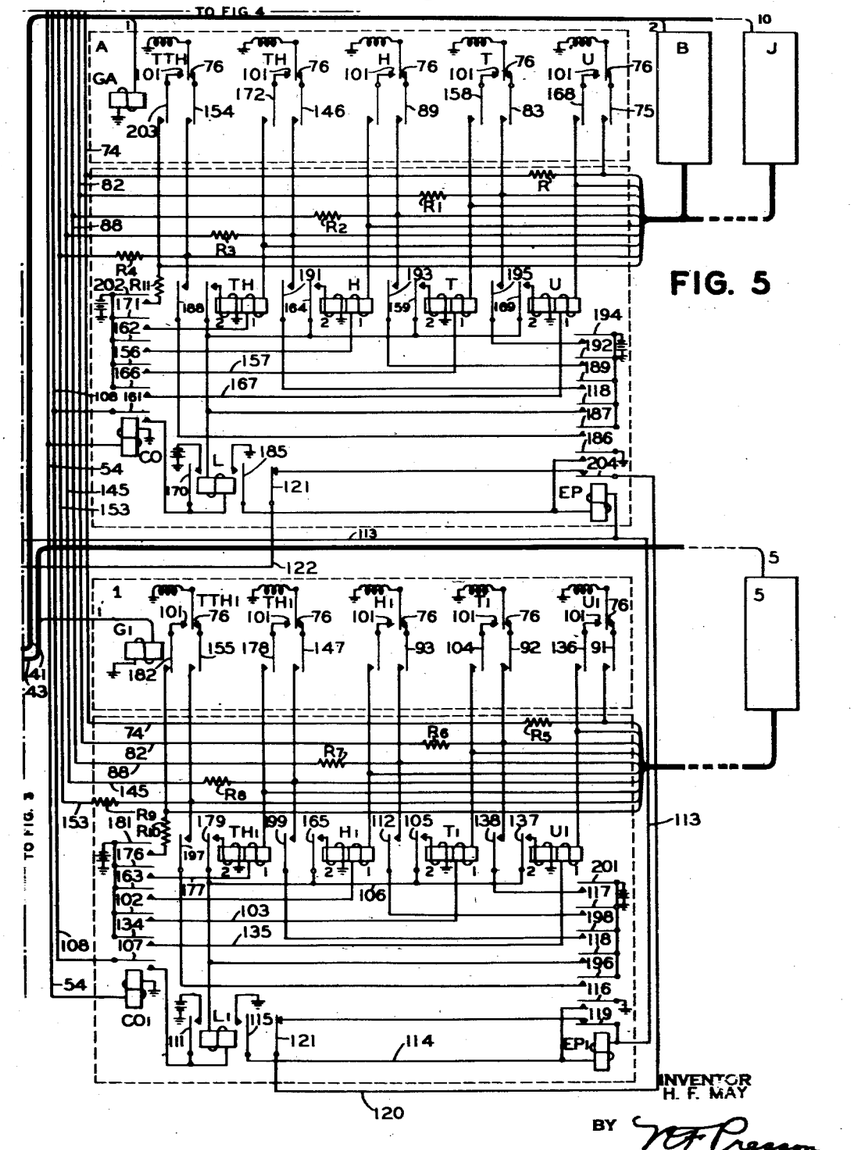
Fig. 5 shows, in diagrammatic form, certain receiving and control apparatus connected to the transmitting apparatus of Figs. 3 and 4 and the control apparatus of Fig. 4.

There is shown on Figs. 1 and 2 of the drawings, a keyset KS suitable for use with the system of Figs. 3 to 5, the keyset 1 having a top portion 2 upon which is mounted, by means of the screws 3, a panel 4 to which is affixed the key strip 5 comprising ten selection keys, designated A to J, for selecting the groups of indicators of the individual inventory board. Associated with each of the selection keys of the keyset is a grouping switch 6 settable to different positions whereby the operation of the associated selection key causes the selection of a group of indicators of the group inventory board in accordance with the setting of the group selection switch. A plurality of keystrips 7, 8, 9, 11 and 13 each comprising the digit keys 1 to 9 is also mounted on the keyset panel 4, these keystrips being employed to set up the ten-thousandths, thousandths, hundreds, tens and units digits of a number to be added or subtracted from the number posted by a selected group of indicating devices on the individual and group inventory boards. The keyset also comprises the keys ADD, SUB, WO and ER, these keys being employed to control certain functions of the receiving apparatus as will be described more in detail as the description proceeds.

Each of the keys comprising the keystrips 5, 7, 8, 9, 11 and 13 is normally held in a raised position by the spring 14, Fig. 2, having one end thereof in engagement with the bearing plate 15 secured to the frame members 16 supported by the panel 4. The upper end of the spring 14 rests against a washer 17 held in position by the pin 18 passing through the key.

A locking member 19 is slidably mounted on the frame members 16 and is provided with a plurality of apertures 21 through which the keys extend. A spring 22, normally urges the locking member 19 against the keys. Each key is provided with a notched portion 23 adapted to be engaged by the locking member 19 when the key is depressed. One locking member 19 is provided for each of the strips of keys 7, 8, 9, 11 and 13. An electromagnet KR comprising an armature 24, pivoted at 25, is provided for actuating the locking elements 19 when the magnet is energized, thereby releasing the operated keys of keystrips 7, 8, 9, 11 and 13. When the key release magnet KR is deenergized the armature 24 thereof is restored to its unoperated position by the retractile spring 26.

Two studs 27 are secured to the casing 1 and provided with shoulders thereon against which the armature 24 normally rests. The studs are provided with pins 28 passing therethrough and washers 29 for maintaining one end of the spring 26 in position whereby the spring 26 holds the armature 24 against the shoulders of the studs 27 with the magnet KR deenergized. Each key is provided with an insulated end 31 for causing the contact springs 32 and 33 to be brought into engagement with the contact springs 34 and 35 respectively and contact spring 36 to be disengaged from contact spring 37 when the key is operated.

Each of the group selection switches 6 is settable to different positions thereby causing an associated wiper arm to be brought into engagement with electrical contacts in accordance with the setting of the switch to select a desired group of indicating devices on the group inventory board when the associated selection key is actuated. Whereas on Fig. 1 of the drawings the grouping switches 6 are shown settable to five different selecting positions, it will be understood that this is by way of illustration only as switches having a greater number of selecting positions or other instrumentalities may be employed without departing from the spirit and scope of the present invention. A cable 38 is provided for connecting the keyset to the associated equipment, the cable having a sufficient number of electrical conductors therein to establish the electrical connections to the keyset.

Description of the system

Figure 6:
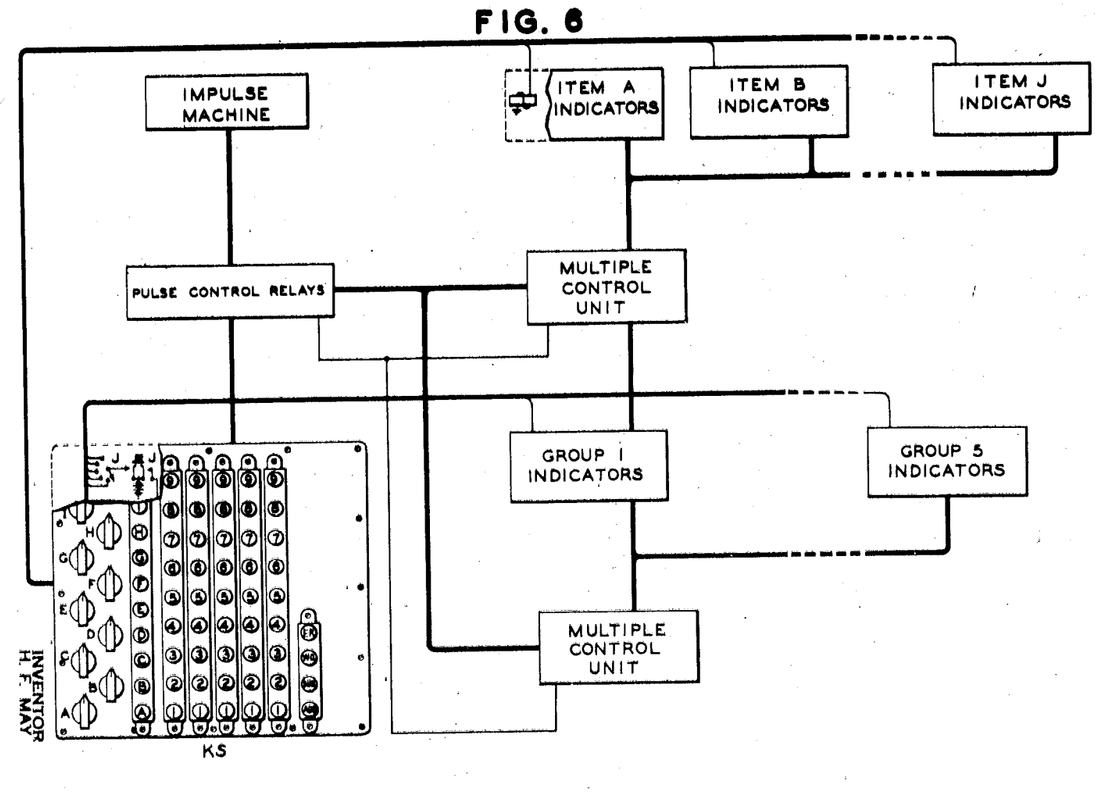
Fig. 6 shows, in diagrammatic form, the entire system according to its broader aspects.

The system according to one of its broader aspects is shown in diagrammatic form on Fig. 6 of the drawings. Referring specifically to Fig. 6, the keyset of Fig. 1 is illustrated thereon and designated by the letters KS, the keyset including the selection keys A to J connected by a group of conductors to the selection relays associated with the groups of indicators A to J whereby these groups of indicators may be selected for operation by the actuation of the associated selector key. In a similar manner the group switches A to J of the keyset are connected by a group of conductors within a cable to the windings of the relays associated with the groups of indicators designated 1 to 5 whereby the groups of indicators 1 to 5 are selected for operation in accordance with the settings of the group switches as the associated keys are operated. This arrangement provides means whereby the operation of the selection key A, for example, may cause the selection of any of the groups of indicators 1 to 5 depending upon the setting of the associated group switch A. The addition or subtraction, as the case may be, of a number set up on the numerical keys of the keyset when the selection key A is operated, with respect to the numbers posted by the indicators of group A and the selected indicators of groups 1 to 5 is thus accomplished by a single operation of the keyset. The digit keys of the keyset are employed to cause the selected registers to post numbers of higher or lower denominational value than the numbers previously posted by the selected indicating devices by an amount corresponding to the value of the number represented by the operated digit keys, the addition and subtraction operation being controlled by the ADD and SUB keys respectively of the keyset. The key designated WO is employed to wipe out the settings of the selected indicator registers and restore them to their normal or zero positions. The key designated ER, when depressed, causes the operation of a release relay, thereby restoring the indicator control equipment comprising the pulse control relays and multiple control units of Fig. 6 to their normal condition.

A plurality of registers each comprising five indicator units is employed for displaying the digits of the numbers posted by the groups of indicators A to J and 1 to 5, although it will be understood that a lesser number of indicators may be employed in each of the groups of indicators if desired.

The indicators may be of any well known construction suitable for the purpose such, for example, as the type disclosed in Patent No. 1,979,028, granted October 30, 1934, to James B. Ewart, or an indicator of the type disclosed in patent to M. L. Haselton No. 2,049,499, granted August 4, 1936, may be employed with the system of the present invention. Each of the indicators comprises a rotatable drum settable to eleven positions for displaying the indicia 0, 1 to 9 and having a blank position intermediate the digits 9 and 0. The indicator includes a switching mechanism operable as the drum moves from position 9 to the blank position to connect the winding of the indicator operating magnet to a first circuit closing element and switch the end of the winding of the operating magnet to a second circuit closing element as the indicator drum is advanced from the blank position to position 0. The electrical connections to the various switching elements and operating coils of the indicators are shown on Fig. 5 of the drawings.

Figure 7:
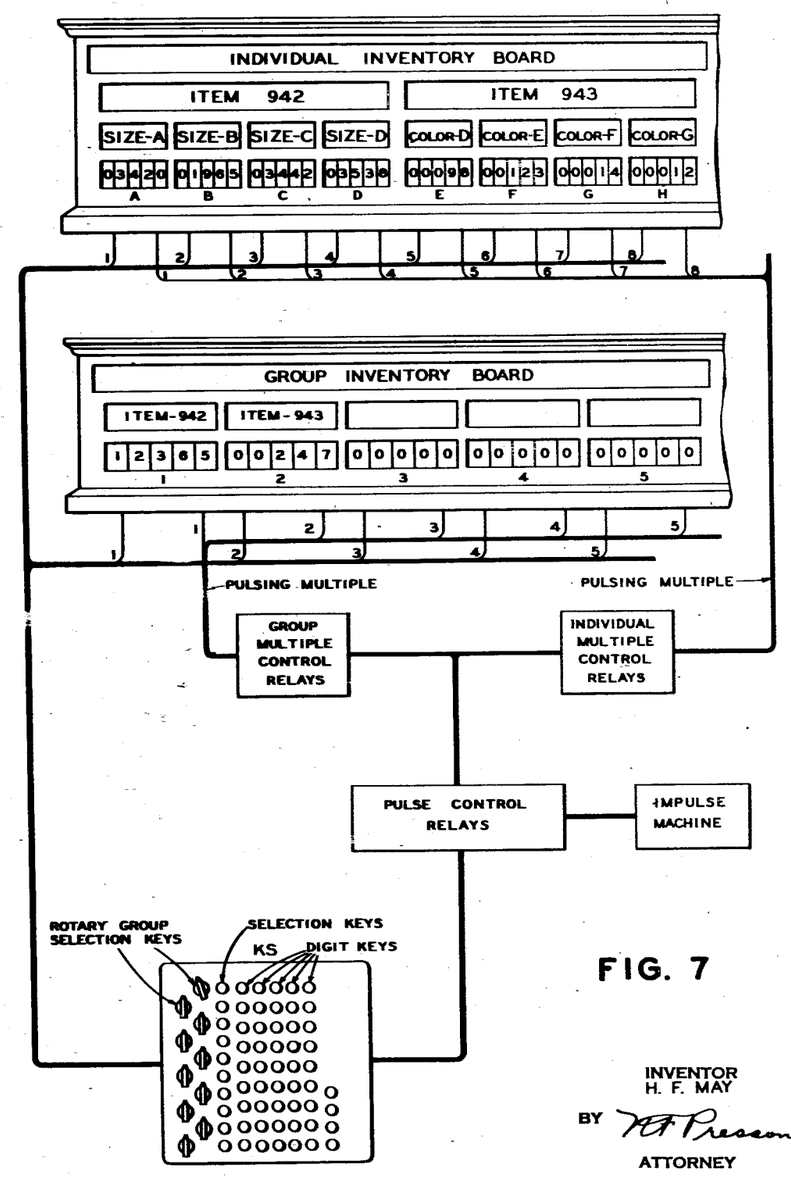
Fig. 7 illustrates, in diagrammatic form, the entire system according to one embodiment of the invention.

Fig. 7 of the drawings shows the entire system in diagrammatic form in accordance with one embodiment of the invention wherein the keyset controls groups of indicators at individual and group inventory boards representing items classified according to one of their characteristics. The individual inventory board of Fig. 7 comprises a plurality of item designations, such as item 942 and item 943 classified according to one of the characteristics of the item, such as size or color, a group of indicator units being associated with each such classification. The group inventory board comprises a plurality of indicators for posting the total number of items in stock such, for example, as 12365 for item 942, 00247 for item 943 and the like. The keyset controls the selection of the groups of indicators corresponding to the individual items such as size A of item 942 of the individual inventory board and at the same time the selection of the indicators corresponding to item 942 of the group inventory board, whereby any change in the amount of stock of size A of item 942 posted on the individual inventory board will be accompanied by a corresponding change in the total amount of stock of item 942 posted on the group inventory board. The system in general is similar to that shown on Fig. 6 wherein the actuation of the selected indicators to their new settings is accomplished by impulses received from an impulse machine and controlled jointly by the operated digit keys of the keyset and the previous settings of the selected indicators, the control equipment comprising individual and group multiple and pulse control relays.

The operation of the system

The operation of the system will best be understood by reference to Figs. 3, 4 and 5 of the drawings on which is shown, in diagrammatic form, the entire system. More specifically Fig. 3 shows the wiring arrangement of the switches and keys comprising the keyboard. Fig. 4 shows an impulse machine IM comprising the cams A, B and C arranged to close their associated contacts as the cams rotate. Fig. 4 also shows a relay counting chain adapted to be operated by impulses from the impulse machine, the counting chain comprising the relays C1 to C10 adapted to interrupt circuits including conductors in a cable extending between contacts of the counting chain and the digit keys of the keyboard, whereby a desired number of actuating impulses is transmitted to the indicating devices of Fig. 5 in accordance with the operated condition of the numerical keys of the keyset. Fig. 4 also shows a start relay ST, a release relay RLS, a subtract relay SUB, a wipeout relay WO and an impulse repeating relay R.

Fig. 5 shows at the upper portion thereof, an individual inventory board comprising the groups of indicating devices A to J. Each of the groups of devices is associated with a selection relay, such as the relay GA for the device A, for selecting the devices for operation. Each group of indicating devices comprises five indicator units designated TTH, TH, H, T and U for displaying the ten-thousandths, thousandths, hundreds, tens and units digits respectively of the number posted by the devices. A group of carry-over relays TH, H, T and U common to the groups of devices A to J is employed for carrying over a digit, when required, and adding this digit to the value of the digits posted by the devices of higher denominational order. Certain control relays designated CO, L and EP are employed in connection with the operation of the system as will hereinafter be explained in more complete detail. There is also shown on Fig. 5 of the drawings, a group inventory board comprising the groups of indicators 1 to 5, each of the groups having five indicator units designated TTH1, TH1, H1, T1 and U1 for posting the digits of the numbers corresponding to the amount of stock on hand classified according to item designations. Associated with the group indicator board is a set of carry over relays designated TH1, H1, T1 and U1 and certain control relays designated CO1, L1 and EP1.

Figure 8:
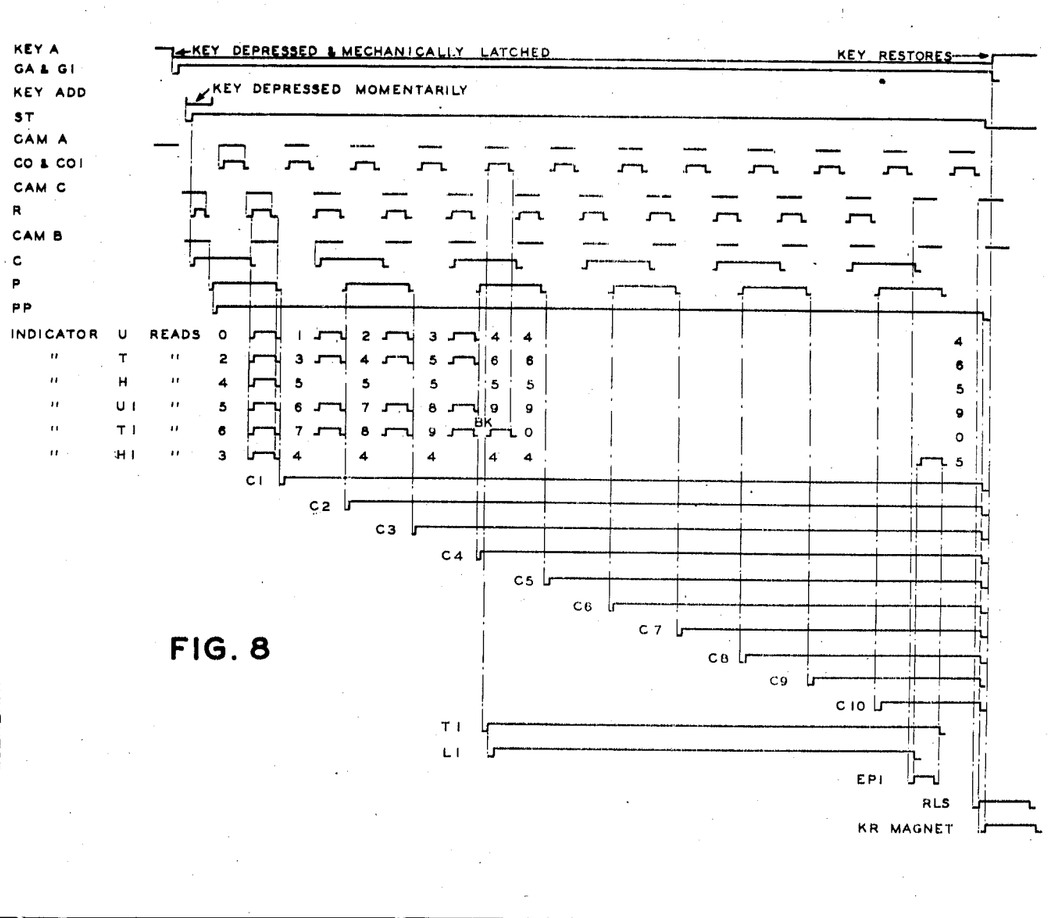
Fig. 8 is a sequence chart illustrative of a typical operation of the apparatus in connection with an additive entry, a specific example of which is hereinafter described in detail.

Now let it be assumed, by way of example, that the group of indicators on the individual inventory board assigned to item 942, size A posts the number 03420 and the group of indicators of the group inventory board assigned to item 942 displays the number 12365 which is the total amount of stock of sizes A, B, C and D of item 942, and that the groups of indicators corresponding to sizes A, B, C and D are associated with the selection keys A, B, C and D respectively of the keyset. The group switches A, B, C and D of the keyset when set to position 1 are associated with a particular item, for example, item 942, and any change in the numbers posted by the groups of indicators A, B, C and D will be accompanied by a corresponding change in the number posted by the indicators of group 1. Let it be further assumed that 144 articles of item 942, size A, are placed in stock and the operator desires to increase the inventory postings for the item by this amount. The manner in which this is accomplished will now be described, and in this connection reference may be had to the sequence chart of Fig. 8. In the sequence chart, the cycle of operation of the various keys, cams, relays, indicators or other electromagnets is represented in each case by a horizontally extending line or series of lines, as viewed from left to right in the chart. In the case of the manually operated keys A and ADD, the downward vertical deflections of the lines depict the operation of the keys and the upward vertical deflections depict the release of the keys. In the case of relays or other electromagnets, the beginning of each of the horizontally extending lines represents the application of operating current to the coil of the relay, indicator or other magnet; the upward vertical deflection of each line depicts the actual closure of the relay contacts or the physical motion of the indicator drum or magnet; the downward vertical deflection of each line depicts the cessation of energizing current; and the end of each line indicates the opening of the relay contacts or the completion of movement of the indicator or other magnet. With regard to the mechanically operated cams A, B and C, the length of each of the horizontal lines depicts the time of closure of the electrical contacts controlled by the cams. The vertical rows of digits associated with the indicators represent the settings of the indicators at successive steps in the additive entry operation of the apparatus. Vertical dot-and-dash lines are employed, in typical instances, to facilitate an understanding of the timing of the various elements; for clarity such lines are omitted when the succeeding operations in a sequence are merely repetitious.

The operator depresses the selection key A, hundreds digit key 1, tens digit key 4 and units digit key 4 and key ADD of his keyset. Key A and the digit keys, it will be recalled, remain in their operated position until released by the key release magnet KR. Key ADD, however, does not lock but releases when the operating pressure has been removed therefrom by the operator. The operation of key A applies battery by way of its contact 39, conductor 1 of cable 41, winding of gang relay GA and thence to ground, thereby causing relay GA to operate, and connect the A group of indicators to the pulsing equipment and the carry-over equipment common to the groups A to J. The operation of selection key A at its contact 42, applies battery by way of wiper and terminal 1 of grouping switch A, conductor 1 of cable 43, winding of relay G1 and thence to ground, thereby causing the gang relay G1 to operate and connect the indicator units of group 1 to the pulsing equipment and the carry-over equipment common to the groups 1 to 5.

The operation of key ADD applies ground by way of conductor 44 to one end of the winding of relay ST from whence the circuit is continued to battery thereby causing relay ST to operate and lock by way of its make contact and armature 45, break contact and armature 46 of relay RLS and thence to ground. The operation of relay ST at its armature 47 applies battery by way of break contact and armature 48 of relay RLS, conductor 49 and thence to the contacts B and C of the impulse machine. The operation of relay ST at its armature 47 also applies battery by way of conductor 49, armature 51 and break contact of relay WO, conductor 52 and thence to the contact A of the impulse machine, conductor 52 also extending to armature 53 of relay C10 which is unoperated at this time.

When cam A closes its contact, battery is applied by way of conductor 54 to the windings of relays CO and CO1, Fig. 5, and thence to ground, thereby causing relays CO and CO1 to operate and apply battery to the actuating ground circuit of each indicator, which circuit is completed only if that indicator is in its blank position. When cam C closes its contact, battery is applied by way of conductor 55, armature 56 and break contact of relay C10 and thence to the winding of relay R, the circuit being continued to ground, thereby causing relay R to operate during the time that the impulse contacts C are closed. Relay R, which operates and releases once during each revolution of cam C, applies pulses from battery at armature 64 of relay PP for pulsing the indicators over the conductors 74, 82, 88, 145 and 153. Closure of cam B also applies battery by way of conductor 57, armature 58 and break contact of relay P, winding 1 of relay C, break contact and armature 59 of relay P and thence to ground, thereby causing relay C to operate and lock by way of its make contact and armature 61 to ground. Cams B and C are arranged to close their contacts at substantially the same time. The operation of relay C at its armature 62 and make contact thereof applies battery to one end of winding 1 of relay P. Relay P, however, does not operate since the same battery previously was applied by way of armature 47 and make contact of relay ST and conductor 49 to the other end of the winding 1 of relay P.

When the impulse contacts B open, battery is removed from conductor 57 and ground on armature 61 of relay C is extended by way of winding 1 of relay C and armature 62 and make contacts thereof, winding 1 of relay P and thence to battery on conductor 49 thereby causing relay P to operate in series with relay C. The operation of relay P at its armature 59 applies ground by way of its make contact, armature 63 and break contact of relay C1, winding of relay PP and thence to battery, thereby causing relay PP to operate and at its armature 64 and make contact thereof apply battery to conductor 65 extending to the armatures 66 of relays C1 to C10 and to certain of the make contacts of relay WO.

When cam A again closes its contacts during this and subsequent revolutions of the cam, relays CO and CO1 operate and remain operated during the period of closure of the cam contacts. When cam B causes its contacts to be closed during the second revolution of the cam, battery is applied by way of conductor 57, armature 58 and make contact of relay P to the winding 2 of relay C from whence the circuit is continued by way of make contact and armature 61 of relay C to ground, thereby setting up a flux within the core of the magnet of relay C in opposition to the flux set up by the operating winding 1 thereof and causing relay C to release. Relay P, however, remains operated by battery at armature 58 and make contact of relay P and winding 2 thereof causing the energization of its locking winding 2 and preventing the release of relay P until the impulse cam B opens its contacts.

The operation of relay R in response to the second closure of cam C completes a circuit from battery at armature 64 and make contact of relay PP, conductor 65, armature 66 and break contact of relay C4, conductor 4 of cable 67, contacts 68 of the digit key U4, conductor 9 of cable 69, break contact and armature 71 of relay SUB, conductor 72, armature 73 and make contact of relay R, conductor 74, resistance R, make contact and armature 75 of relay GA, switch contact 76 and winding of indicator unit U and thence to ground, thereby causing indicator U to operate. A circuit is also closed from battery at armature 64 and make contact of relay PP, conductor 65, armature 66 and break contact of relay C4, conductor 4 of cable 67, contacts 77 of tens digit key T4, conductor 7 of cable 69, break contact and armature 78 of relay SUB, conductor 79, armature 81 and make contact of relay R, conductor 82, resistance R1, make contact and armature 83 of relay GA, switch contact 76 and winding of indicator T and thence to ground, thereby causing indicator T to operate. A circuit is also closed from battery at armature 64 and make contact of relay PP, conductor 65, armature 66 and break contact of relay C1, conductor 1 of cable 67, contact 84 of hundreds digit key H1, conductor 5 of cable 69, break contact and armature 85 of relay SUB, conductor 86, armature 87 and make contact of relay R, conductor 88, resistance R2, make contact and armature 89 of relay GA, switch contact 76 and winding of indicator unit H and thence to ground, thereby causing indicator H to operate.

Conductor 74, it will be noted, extends to resistance R5, from whence the circuit is continued to make contact and armature 91 of relay G1, thereby applying battery by way of switch contact 76 and winding of indicator U1 of group 1 of the group inventory board and causing indicator U1 to operate in parallel with indicator U.

In a similar manner conductor 82 extends to resistance R6 from whence the circuit is continued by way of make contact and armature 92 of relay G1, contacts 76 and winding of indicator unit T1, thereby causing the indicator unit T1 to operate in parallel with indicator T. Conductor 88, likewise, extends to resistance R7 from whence the circuit is continued by way of make contact and armature 93 of relay G1, switch contact 76 and winding of indicator H1, thereby causing indicator H1 to operate in parallel with indicator H.

As contacts of cam C are disengaged, relay R releases and removes battery from conductors 74, 82 and 88, thereby causing indicators H, T, U, H1, T1 and U1 to release and advance the indicating drums thereof to positions 5, 3, 1, 4, 7 and 6 respectively. When the contacts of cam B open battery is removed from conductor 57 and relay P releases. The release of relay P at its armature 59 removes ground from one end of the winding of relay C1 thereby causing relay C1 to operate in series with the winding of relay PP over the following circuit: Battery, winding of relay PP, winding of relay C1, make contact and armature 94 of relay PP, conductor 95, break contact and armature 96 of relay RLS and thence to ground. The operation of relay C1 at its armature 66 interrupts the circuits of all the No. 1 keys of the keyset and hence the operating circuits for the indicators H and H1 thereby causing these indicators to remain set in position to display the digits 5 and 4 respectively until the indicator H1 is stepped ahead to display the digit 5 by the carry-over impulse in a manner which will be apparent as the description proceeds. Indicators H and H1 are now unresponsive to additional operations of relay R during subsequent revolutions of the cam C.

The closure of the cam A contacts causes relays CO and CO1 to operate, and release as the cam contacts are disengaged. The closure of cam B during the next succeeding revolution of the cam applies battery by way of conductor 57, armature 58 and break contact of relay P, winding 1 of relay C, break contact and armature 59 of relay P to ground, thereby causing relay C to operate. When the contacts of cam B open, battery is removed from conductor 57 thereby causing relay P to operate in series with relay C. The operation of relay R in response to the closure of cam C contacts applies battery to conductors 74 and 82 thereby energizing indicators T and U, and when relay R releases the indicators are stepped to their positions 4 and 2 respectively and indicators T1 and U1 are stepped to positions 8 and 7 respectively.

The operation of relay P at its armature 59 and make contact thereof applies ground by way of armature 63 and make contact of relay C1, armature 97 and break contact of relay C3, to the winding of relay C2 thereby causing relay C2 to operate and at its armature 66 remove battery from conductor 2 of cable 67 extending to the contacts of the digit keys 2 of the keyset. Relay C2 locks by way of its make contact and armature 98, conductor 95, break contact and armature 96 of relay RLS to ground. Relay C3 does not operate at this time for the reason that ground is applied to both ends of its winding by armature 59 of relay P and armature 96 of relay RLS respectively.

The operation of relay R in response to the closure of the cam contact C during the fourth revolution of the cam causes the indicators T and U to be stepped ahead to positions 5 and 3 respectively and the indicators T1 and U1 to be stepped ahead to positions 9 and 8 respectively.

The release of relay P when cam B opens its contacts, removes ground from one end of the winding of relay C3 thereby causing relay C3 to operate in series with relay C2 and at its armature 66 remove battery from conductor 3 of cable 67 extending to contacts of the digit keys 3.

The operation of relay R in response to the closure of cam C applies battery to conductors 74 and 82 thereby causing the tens and units indicators T and U to be moved ahead to their positions 6 and 4 respectively and the indicators T1 and U1 to be moved ahead to their positions blank and 9 respectively as relay R releases. As indicator T1 is moved from its position 9 to the blank position the switching element thereof is disengaged from its contact 76 and brought into engagement with contact 101.

The operation of relays C and P by the cam contact B causes ground at armature 99 and make contact of relay P to be applied by way of armature 63 and make contact of relay C1, armature 97 and make contact of relay C3, armature 99 and break contact of relay C5, and thence to the winding of relay C4 causing relay C4 to operate and at its armature 66 remove battery from conductor 4 of cable 67 extending to the digit keys T4 and U4 of the keyset.

When cam A closes its contact battery is applied by way of conductor 54 to the windings of relays CO and CO1 causing relays CO and CO1 to operate. Battery at armature 102 and make contact of relay CO1 is applied by way of conductor 103, winding 1 of relay T1, make contact and armature 104 of relay G1, contact 101 and switch member thereof, winding of indicator T1 and thence to ground thereby causing relay T1 and indicator T1 to be operated in series. Relay T1 locks from ground, winding 2 of relay T1, make contact and armature 105 of relay T1, conductor 106, winding of relay L, make contact and armature 107 of relay CO1, conductor 108, break contact and armature 109 of relay WO, conductor 49, armature 48 and break contact of relay RLS, armature 47 and make contact of relay ST to battery, thereby causing relay L1 to operate and lock by way of its armature 111 and make contact to battery.

The operation of relay T1 at its armature 112 closes in part a circuit to the winding of indicator H1 which, it will be recalled, is now set to display the digit 4. When cam C contacts open, relays CO and CO1 release, relay CO1 at its armature 102 removing battery from winding 1 of relay T1 and the winding of indicator T1 thereby causing the indicator T1 to be stepped ahead to display the digit 0. Relay T1, however, does not release as it is held in the operated position by current flowing through its winding 2. As the indicator T1 moves from position blank to position 0, the switch element thereof is disengaged from contact 101 and brought into engagement with contact 76 thereby rendering the indicator T1 unresponsive to additional operations of relay CO1 as cam A continues its operation.

As cam B continues its operation, relays C and P are caused to operate and release successively thereby operating relays C5 to C10 in succession, all of the relays PP and C1 to C10 locking to ground at the break contact and armature 96 of relay RLS. The operation of relay R during these revolutions of the cam B is without effect for the reason that the circuits including armature 66 and break contact of these relays are open at the contacts of the associated digit keys of the keyset. With relay C10 operated, the closure of cam C contacts applies battery by way of conductor 55, armature 56 and make contact of relay C10, conductor 113, winding of relay EP1, conductor 114, armature 115 and make contact of relay L1 to ground, thereby causing relay EP1 to operate and lock by way of its make contact and armature 116 to ground. The operation of relay EP1 applies battery by way of its armature 117 and make contact, armature 112 and make contact of relay T1, make contact and armature 93 of relay G1, switch contact 76 and winding of indicator H1 and thence to ground, thereby causing indicator H1 to operate. The operation of relay EP1 at its armature 118 and make contact thereof applies battery to one end of the winding of relay L1 thereby short circuiting the winding and causing relay L1 to release. As cam contacts C are disengaged battery is removed from conductor 55 thereby causing relay EP1 to release and at its armature 118 remove battery from armature 105 of relay T1 thereby causing relay T1 to release and at its armature 112 interrupt the circuit to the winding of indicator H1, thereby causing indicator H1 to be stepped ahead and post the digit 5.

When cam C contacts close during the subsequent revolution of the cam, battery is applied to conductor 55, armature 56 and make contact of relay C10, conductor 113, armature 119 and break contact of relay EP1, break contact and armature 121 of relay L1, conductor 120, armature 204 and break contact of relay EP, break contact and armature 121 of relay L, conductor 122, winding of the release relay RLS and thence to ground thereby causing relay RLS to operate and lock by way of its armature 123 and make contact, armature 124 and make contact of relay ST to battery. The operation of relay RLS at its armature 96 removes ground from conductor 95 thereby releasing relays PP and C1 to C10. As armature 96 of relay RLS moves into engagement with its make contact, ground is applied to conductor 125 and thence to the winding of the key release magnet KR, the circuit continuing to battery, thereby causing the key release magnet to operate and release the selection key A and the hundreds, tens and units digit keys H1, T4 and U4 respectively. The release of the selection key A removes battery from conductor 1 of cable 41, thereby releasing the gang relay GA. The release of the selection key A at its contact 42 removes battery from conductor 1 of cable 43 thereby releasing the gang relay G1. As armature 48 of relay RLS moves away from its back contact battery is removed from conductor 49 thereby rendering cams A, B and C of the impulse machine ineffective. The operation of relay RLS at its armature 46 removes ground from the locking circuit of relay ST, thereby causing relay ST to release. As armature 124 of relay ST moves away from its make contact battery is removed from the locking circuit of relay RLS, thereby releasing relay RLS. The release of relay RLS at its armature 96 removes ground from conductor 125 thereby releasing the key release magnet KR.

The number 03420 previously posted by the group of indicators associated with size A of item 942 on the individual inventory board has been combined with the number 144 set up on the keyset and the number 03564 is now posted by this group of indicators on the individual inventory board. The number 12365 previously posted by the group of indicators associated with item 942 of the group inventory board has also been combined with the number 144, the indicators now posting the number 12509.

In a similar manner, any number may be added to the number posted by any group of indicators of the individual inventory board and the sum of the numbers automatically posted by the selected indicators of the individual inventory board and, concurrently therewith, the number posted by a group of indicators of the group inventory board may be increased by a like amount and the new number posted by the indicators of the group inventory board, this being accomplished by a single keyset operation whereby the relay counting mechanism operates to interrupt the impulse operating circuits to the selected devices when sufficient impulses have been transmitted thereto to step the indicator mechanisms ahead by an amount corresponding to the numerical value of the digit keys operated. In the example just described the sum of the digits posted by the indicator T1 and the digit set up by the tens key of the keyset was greater than 9, thereby causing the operation of relay T1 to effect a carry over of one digit to the digit posted by the hundreds indicator H1. In a similar manner whenever, as a result of the addition process, the sum of a digit posted by any of the indicators and the digit of like denominational value to be added exceeds 9, the switching mechanism of the indicator unit is disengaged from its contact 76 and moved into engagement with its contact 101, thus causing the operation of the associated carry over relay and establishing an operating circuit to the winding of the indicator of the next higher denominational order whereby the next higher denominational indicator is stepped ahead to its correct setting by the operation of relay EP after relay C10 operates. In such a case, as for example, when the number 99999 is posted by the selected group of indicators and a number is added thereto requiring the carry over operation of several of the digits posted by the indicator units, the carry over relays may be operated in succession thereby causing relay L to be successively operated and released whereby relay EP is operated successively during successive revolutions of the cam C, after relay C10 has operated, thereby applying carry over impulses as required to set up the correct numerical sum of the numbers posted by the device and the number to be added and cause this sum to be posted by the indicators. When all carry over operations have been completed, relay L, or L1 as the case may be, at its armature 121 and break contact thereof closes a circuit to the winding of relay RLS by way of conductor 122 whereby relay RLS is operated by the closure of the impulse contact C of the impulse machine thereby releasing the equipment.

*Operation of the subtraction feature*

The number set up on the digit keys of the keyset may be subtracted from the numbers posted by a selected group of indicators on the individual inventory board and by a selected group of indicators on the group inventory board, a single keyset operation being required for accomplishing this subtraction. The manner in which this is accomplished will best be understood by consideration of a specific example.

Assume, by way of example, that the number of size A of item 942 posted by the individual inventory board is 03564 and the total of item 942 posted by the group inventory board is 12509 and that a sale of twelve of these items, size A, has been made and the sales girl or cashier, as the case may be, desires to reduce the amount posted by the size A indicators of the individual inventory board and the item 942 indicators of the group inventory board by this amount. The operator depresses the selection key A, digit keys T1 and U2 and the key SUB of the keyset. Keys A, T1 and U2 remain in their operated positions until released by the operation of the key release magnet and key SUB releases immediately after the operator removes the pressure from the key top. The operation of the selection key A causes relay GA to operate and, with the grouping switch A set in position 1, the operation of selection key A also operates relay G1. The operation of key SUB at contact 126 thereof applies ground by way of conductor 127 to the winding of relay SUB and thence to battery, thereby causing relay SUB to operate and lock by way of its make contact and armature 128, conductor 129, break contact and armature 46 of relay RLS and thence to ground. The operation of key SUB at contact 131 thereof applies ground by way of conductor 44 to the winding of relay ST and thence to battery thereby causing relay ST to operate and lock by way of its make contact and armature 45 to ground at the break contact and armature 46 of relay RLS. The operation of the relay ST at its armature 47 applies battery to cams A, B and C of the impulse machine thereby causing the operation of relays C and P, PP and C1 to C10 under control of the impulse contacts of cam B in the manner previously described.

The pulse repeating relay R is operated by cam C contacts during the time the counting relay chain is undergoing a cycle of operations and is effective to cause the selected indicators to be stepped ahead to their new settings when battery at armature 64 of relay PP has been applied to the armatures 66 of relays C1 to C10 by the operation of relay PP.

The operation of relay R in response to the closure of cam C following the operation of relay PP causes a battery impulse to be applied to the tens indicators T and T1 of the selected group of indicators on the individual and group inventory board over the following circuit: Battery at armature 64 and make contact of relay PP, conductor 65, armature 66 and break contact of relay C8, conductor 8 of cable 67, contact 132 of digit key T1, conductor 8 of cable 69, make contact and armature 78 of relay SUB, conductor 79, armature 81 and make contact of relay R, conductor 82, resistance R1, make contact and armature 83 of relay GA, switch contact 76 and switch element of indicator T, winding of indicator T to ground, thereby causing the tens indicator T to operate. The battery impulse applied to conductor 82 is also extended by way of resistance R6, make contact and armature 92 of relay G1, switch contact 76 and switch element thereof, winding of indicator T1 and thence to ground, thereby causing the indicator T1 to operate.

In a similar manner a circuit is closed from battery at armature 64 and make contact of relay PP, conductor 65, armature 66 and break contact of relay C8, conductor 8 of cable 67, contact 133 of key U2, conductor 10 of cable 69, make contact and armature 71 of relay SUB, conductor 72, armature 73 and make contact of relay R, conductor 74, resistance R, make contact and armature 75 of relay GA, contact 76 and switch element of indicator U, winding of indicator U and thence to ground, thereby causing the indicator U to operate. Conductor 74, it will be noted, also extends to resistance R5 from whence the circuit is continued by way of make contact and armature 91 of relay G1, contact 76 and switching element of indicator U1, winding of indicator U1 to ground, thereby causing indicator U1 to operate.

When the impulse contacts of cam C open, relay R releases and at its armatures 73 and 81 removes battery from the windings of indicators T, U, T1 and U1, thereby causing indicators T and U to be stepped ahead to their positions 7 and 5 respectively and indicators T1 and U1 to be stepped ahead to positions 1 and blank respectively. As indicator U1 moves into its position blank, the switching element thereof is disengaged from contact 76 and brought into engagement with contact 101.

A circuit is also closed from battery at armature 64 and make contact of relay PP, conductor 65, armature 66 and break contact of relay C9, conductor 9 of cable 67, break contacts 139 of the digit keys H1 to H9 in series, conductor 6 of cable 69, make contact and armature 85 of relay SUB, conductor 86, armature 87 and make contact of relay R, conductor 88, resistance R2, make contact and armature 89 of relay GA, contact 76 and switch element of indicator H, winding of indicator H to battery, thereby operating indicator H. Conductor 88 also extends to resistance R7 from whence the circuit is continued to make contact and armature 93 of relay G1, switch contact 76 of indicator H1, winding of indicator H1 and thence to ground, thereby operating indicator H1.

Conductor 9 of cable 67 also extends to contact 141 of the digit key TH1 from whence the circuit is continued by way of contacts 141 of the digit keys TH1 to TH9 in series, conductor 4 of cable 69, make contact and armature 142 of relay SUB, conductor 143, armature 144 and make contact of relay R, conductor 145, resistance R3, make contact and armature 146 of relay GA, switch contact 76 of indicator TH, winding of indicator TH to ground, thereby operating indicator TH. Conductor 145, it will be noted, also extends to resistance R8 from whence the circuit is continued by way of make contact and armature 147 of relay G1, switch contact 76 of indicator TH1, winding of indicator TH1 to ground, thereby operating indicator TH1.

A circuit is also closed from conductor 9 of cable 67, contacts 148 of digit keys TTH1 to TTH9 in series, conductor 2 of cable 69, make contact and armature 149 of relay SUB, conductor 151, armature 152 and make contact of relay R, conductor 153, resistance R4, make contact and armature 154 of relay GA, switch contact 76 of indicator TTH, winding of indicator TTH to ground, thereby operating indicator TTH. Conductor 153 also extends to resistance R9 from whence the circuit is continued by way of make contact and armature 155 of relay G1, switch contact 76 of indicator TTH1, winding of indicator TTH1 and thence to ground. The release of relay R in response to the opening of cam C contacts, removes battery from the conductors 88, 145 and 153 thereby causing the indicators TTH, TH and H to be stepped ahead to positions 1, 4 and 6 respectively and the indicators TTH1, TH1 and H1 to be stepped ahead to positions 2, 3 and 6 respectively.

The release of relay P at its armature 59 removes ground from one end of the winding of relay C1, thereby causing relay C1 to operate in series with relay PP, and at its armature 66 remove battery from conductor 1 of cable 67. When cam A closes its contacts, battery is applied by way of conductor 54 to the windings of relays CO and CO1 causing relays CO and CO1 to operate. Battery at armature 134 of relay CO1 and make contact thereof is applied by way of conductor 135, winding 1 of relay U1, make contact and armature 136 of relay G1, contact 101 and switch member thereof, winding of indicator U1 and thence to ground, thereby causing indicator U1 and relay U1 to be operated in series. Relay U1 locks from ground, winding 2 of relay U1, make contact and armature 137 of relay U1, conductor 106, winding of relay L1, make contact and armature 167 of relay CO1, conductor 108, break contact and armature 109 of relay WO, conductor 49, armature 48 and break contact of relay RLS, armature 47 and make contact of relay ST to battery, thereby causing relay L1 to operate and lock by way of its armature 111 and make contact to battery.

The operation of relay U1 at its armature 138 closes in part a circuit to the winding of indicator T1, which, it will be recalled, is now set to display the digit 1. When cam C contacts open, relays CO and CO1 release, relay CO1 at its armature 134 removing battery from winding 1 of relay U1 and the winding of indicator U1, thereby causing the indicator U1 to be stepped ahead to display the digit 0. Relay U1, however, does not release as it is held in the operated position by current flowing through its winding 2. As indicator U1 moves from position blank to position 0, the switch element thereof is disengaged from contact 101 and brought into engagement with contact 76, thereby rendering the indicator U1 unresponsive to additional operations of relay CO1 as cam A continues its operation.

The indicators TTH, TH, H, T and U are now stepped to positions to post the number 14675 in response to the first operation of relay R and the indicators TTH1, TH1, H1, T1 and U1 are set to positions 2, 3, 6, 1 and 0 respectively, the indicator unit U1 having been advanced from its blank position to position 0 by the operation of relay CO1 at its armature 134, the operation of relay C1 occurring after relay R has released.

When the fourth set of impulses has been received from relay R, the release of relay R in response to the opening of the C contacts of the impulse machine causes the indicators TTH, TH, H, T and U to be stepped ahead to their positions 4, 7, 9, blank and 8 respectively and the indicators TTH1, TH1, H1, T1 and U1 to be stepped ahead to positions 5, 8, 9, 4 and 3 respectively. As indicator T moves from position 9 to position blank, the switch element thereof is disengaged from its contact 76 and brought into engagement with contact 101.

The operation of relay CO in response to the closure of cam A, applies battery at its armature 156 and make contact thereof, conductor 157, winding 1 of indicator T, make contact and armature 158 of relay GA, contact 101 and switching element of indicator T, winding of indicator T and thence to ground, thereby causing indicator T and relay T to operate. Relay T locks from ground through its winding 2, make contact and armature 159 of relay T, winding of relay L, make contact and armature 161 of relay CO, conductor 108, break contact and armature 109 of relay WO, conductor 49, armature 48 and break contact of relay RLS, armature 47 and make contact of relay ST, and thence to battery, thereby operating relay L, which locks by way of its armature 170 and make contact to battery. As the contacts of cam A are disengaged, relay CO releases and indicator T steps ahead to its position 0 and the switch element thereof is disengaged from its contact 101 and brought into engagement with its contact 76.

As the fifth set of impulses are received from relay R, indicators TTH, TH, H, T and U are stepped ahead to positions 5, 8, BL, 1 and 9 respectively and indicators TTH1, TH1, H1, T1 and U1 are stepped ahead to positions 6, 7, BL, 5 and 4 respectively. As indicators H and H1 are moved from their positions 9 to their blank positions, their switching elements are disengaged from contacts 76 and brought into engagement with their contacts 101. The operation of relays CO and CO1 in response to the closure of cam A, causes the operation of indicator H and relay H at armature 162 and make contact of relay CO and the operation of the indicator H1 and relay H1 at armature 163 and make contact of relay CO1, relays H and H1 locking by way of their windings 2, make contacts and armatures 164 and 165 respectively, to battery at armature 47 and make contact of relay ST. The release of relays CO and CO1 as the A contacts of the impulse machine are disengaged causes the indicators H and H1 to be stepped ahead to their positions 0, with the switching elements thereof in engagement with their contacts 76, the indicators TTH, TH, H, T and U now being set to positions 5, 8, 0, 1 and 9 respectively and the indicator units TTH1, TH1, H1, T1 and U1 being stepped ahead to their positions 6, 7, 0, 5 and 4 respectively.

As relay R operates in response to the sixth closure of cam C, indicators TTH, TH, H, T and U are energized and as relay R releases they are stepped ahead to positions 6, 9, 1, 2, and BL respectively and indicators TTH1, TH1, H1, T1 and U1 are stepped ahead to positions 7, 8, 1, 6 and 5 respectively. As indicator U moves from position 9 to its blank position, the switching element thereof is disengaged from its contact 76 and brought into engagement with contact 101. The operation of relay CO in response to the closure of the cam A contacts applies battery by way of armature 166 and make contact of relay CO, conductor 167, winding 1 of relay U, make contact and armature 168 of relay GA, switch contact 101 of indicator U, winding of indicator U and thence to ground, thereby causing indicator U and relay U to operate. Relay U locks by way of its winding 2, make contact and armature 169 to battery at armature 47 of relay ST. As relay CO releases indicator U steps ahead to its position 0 and the switching element thereof is again brought into engagement with its contact 76.

As the seventh impulse is received from relay R, indicators TTH, TH, H, T and U are stepped ahead to their positions 7, BL, 2, 3 and 1 respectively and indicators TTH1, TH1, H1, T1 and U1 are stepped ahead to their positions 8, 9, 2, 7 and 6 respectively. As indicator TH moves from position 9 to its blank position, the switching element thereof is moved out of engagement with contact 76 and brought into engagement with contact 101. The operation of relay CO at its armature 171 and make contact thereof applies battery to winding 1 of relay TH, make contact and armature 172 of relay GA, switch contact 101 of indicator TH, winding of indicator TH and thence to ground, thereby operating indicator TH and causing it to be stepped ahead to position 0 as relay CO releases. As the indicator TH moves from its position blank to position 0, the switching element thereof is disengaged from contact 101 and brought into engagement with its contact 76.

As the eighth impulse is received from relay R, indicators TTH, TH, H, T and U are stepped ahead to their positions 8, 1, 3, 4 and 2 respectively and indicator units TTH1, TH1, H1, T1 and U1 are stepped ahead to their positions 9, BL, 3, 8 and 7 respectively. The disengagement of impulse contact cam B removes the short circuit from relay P, causing relay P to operate and at its armature 59 and make contact thereof apply ground by way of armature 63 and make contact of relay C1, armature 97 and make contact of relay C3, armature 99 and make contact of relay C5, armature 173 and make contact of relay C7, armature 174 and break contact of relay C9, winding of relay C8 and thence to battery, thereby causing relay C8 to operate, relays C2 to C7 having previously operated in succession after each of the impulses 2 to 7 were received. Relay C8 at its armature 66 removes battery from conductor 8 of cable 67 extending to contacts 132 of the digit key T1 and contacts 133 of the digit key U2, thereby rendering the indicators T and U, T1 and U1 unresponsive to additional operations of relay R, the indicators now posting the digits 4, 2, and 8, 7 respectively.

As indicator TH1 is moved from its position 9 to position BL, the switch element thereof is disengaged from its contact 76 and brought into engagement with its contact 101. The operation of relay CO1 at its armature 176 applies battery by way of its make contact to conductor 177, winding 1 of relay TH1, make contact and armature 178 of relay G1, switch contact 101 of indicator TH1, winding of indicator TH1 and thence to ground, thereby operating the indicator TH1 and relay TH1, relay TH1 locking by way of its winding 2, make contact and armature 179 to battery at armature 47 of relay ST. As relay CO1 releases in response to the opening of cam A, indicator TH1 is stepped ahead from its position blank to position 0 and the switching element thereof is brought into engagement with its contact 76.

As relay R operates in response to the ninth impulse from cam C, the indicators TTH, TH, and H are stepped ahead to positions 9, 2 and 4 respectively and the indicators TTH1, TH1 and H1 are stepped ahead to positions BL, 1 and 4 respectively, the switching element of TTH1 being disengaged from its contact 76 and brought into engagement with contact 101 as indicator TTH1 moves from its position 9 to position BL. The operation of relay CO1 at its armature 181 applies battery by way of resistance R10, make contact and armature 182 of relay G1, switching contact 101 of indicator TTH1, winding of indicator TTH1 and thence to ground, thereby operating indicator TTH1 and causing it to be stepped ahead to its position 0 when relay CO1 releases. The resistance R10 is employed to limit the current flowing through the winding of indicator TTH1 and is preferably of the same order of magnitude as the resistance of the operating winding 1 of each of the carry over relays. Preferably, though not necessarily, a resistance such as the resistance R10 may be employed in series with each of the armatures 188, 191, 193 and 195 of relays TH, H, T and U respectively and armatures 197, 199, 112 and 138 of relays TH1, H1, T1 and U1 respectively whereby the indicators for posting the ten thousands, thousands, hundreds and tens digits of the numbers receive substantially the same amount of current regardless of whether battery is applied thereto by the operation of relays CO and CO1 or by relays EP and EP1. When the ninth pulse terminates relay C9 operates. The operation of relay C9 at its armature 68, removes battery from conductor 9 of cable 67 extending to contact 139 of key H1, contact 141 of key TH1 and contact 148 of key TTH1 thereby preventing the relay R from sending a tenth impulse to the indicators TTH, TH, H, TTH1, TH1 and H1.

As cam B opens its contacts, following the operation of relay R, the short circuit is removed from relay P causing relay P to operate and at its armature 59 and make contact apply ground by way of armature 63 and make contact of relay C1, armature 97 and make contact of relay C3, armature 99 and make contact of relay C5, armature 173 and make contact of relay C7, armature 174 and make contact of relay C9, contact 183 and winding of relay C10 and thence to battery, thereby causing relay C10 to operate and lock by way of its make contact and armature 184, conductor 95, break contact and armature 96 of relay RLS to ground. The operation of relay C10 at its armature 56 interrupts the operating circuit to relay R and closes an operating circuit by way of conductor 113 to the windings of relays EP and EP1 in parallel, the circuit for relay EP being continued by way of armature 185 and make contact of relay L to ground and the circuit for relay EP1 continuing by way of conductor 114, armature 115 and make contact of relay L1 to ground, thereby causing relays EP and EP1 to operate. Relay EP locks by way of its make contact and armature 186 to ground and relay EP1 locks by way of its make contact and armature 116 to ground.

The operation of relay EP at its armature 118 and make contact thereof applies battery to one end of the winding of relay L, thereby short circuiting the winding of relay L and causing relay L to release. In a similar manner, the operation of relay EP1 at its armature 198 causes relay L1 to release.

The operation of relay EP at its armature 187 and make contact applies battery by way of armature 188 and make contact of relay TH, make contact and armature 154 of relay GA, switching contact 76 of indicator TTH, winding of indicator TTH and thence to ground, thereby operating indicator TTH. Relay EP at its armature 189 and make contact applies battery by way of armature 191 and make contact of relay H, make contact and armature 146 of relay GA, switching contact 76 of indicator TH, winding of indicator TH and thence to ground, thereby operating indicator TH. Relay EP at its armature 192 and make contact thereof applies battery by way of armature 193 and make contact of relay T, make contact and armature 89 of relay GA, switching contact 76 of indicator H, winding of indicator H and thence to ground, thereby operating indicator H. Indicator T is operated from battery at armature 194 and make contact of relay EP, armature 195 and make contact of relay U, make contact and armature 83 of relay GA, switching contact 76, winding of indicator T and thence to ground.

A circuit is also closed from battery at armature 196 and make contact of relay EP1, armature 197 and make contact of relay TH1, make contact and armature 155 of relay G1, switching contact 76 of indicator TTH1, winding of indicator TTH1 and thence to ground, thereby operating indicator TTH1. Relay EP1 at its armature 198 and make contact thereof applies battery to armature 199 of relay H1, make contact and armature 147 of relay G1, switching contact 76 of indicator TH1, winding of indicator TH1 and thence to ground, thereby operating indicator TH1. Indicator T1 is operated from battery at armature 201 and make contact of relay EP1, armature 138 and make contact of relay U1, make contact and armature 92 of relay G1, switching contact 76 of indicator T1, winding of indicator T1 and thence to ground.

As cam C opens its contacts relays EP and EP1 release and indicators TTH, TH, H and T are stepped ahead to their positions BL, 3, 5 and 5 respectively and indicators TTH1, TH1 and T1 are stepped ahead to their positions 1, 2 and 9 respectively. As indicator TTH moves from its position 9 to position BL, the switching element thereof is moved away from its contact 76 and into engagement with its contact 101. The operation of relay CO in response to the closure of cam A applies battery by way of armature 202 and make contact of relay CO, resistance R11, make contact and armature 203 of relay GA, switching contact 101 of indicator TTH, winding of indicator TTH and thence to ground, thereby operating indicator TTH and causing it to step ahead to its position 0 when relay CO releases. The number 12 has been subtracted from the number 03564 previously posted on the indicators TTH, TH, H, T and U, the indicators now displaying the remainder 03552. The number 12 has likewise been subtracted from the number 12509 previously posted by the indicators TTH1, TH1, H1, T1 and U1, the indicators now posting the remainder 12497. When cam C contacts again close, battery is applied to conductor 55, armature 56 and make contact of relay C10, conductor 113, armature 119 and break contact of relay EP1, break contact and armature 121 of relay L1, conductor 120, armature 204 and break contact of relay EP, break contact and armature 121 of relay L, conductor 122 from whence the circuit continues to the winding of relay RLS and thence to ground, thereby causing relay RLS to operate and lock by way of its armature 123 and make contact, armature 124 and make contact of relay ST to battery.

The operation of relay RLS at its armature 96, removes ground from conductor 95 thereby causing relays PP and C1 to C10 to release. The operation of relay RLS at its armature 96 and make contact thereof causes the key release magnet KR to operate and release the selection key A and the digit keys T1 and U2 of the keyset. The release of the selection key A causes the gang relays GA and G1 to release. As armature 48 of relay RLS moves away from its back contact, battery is removed from cams A, B and C of the impulse machine. The operation of relay RLS at its armature 46 removes ground from the locking circuit of relay ST thereby causing relay ST to release. The release of relay ST at its armature 124 removes battery from the locking circuit of relay RLS, thereby releasing relay RLS. The release of relay RLS at its armature 96 removes ground from the key release magnet KR, thereby causing the key release magnet to release.

In a similar manner any number may be subtracted from the number posted by a selected group of indicators of the individual inventory board and the remainder automatically posted by the selected indicators; also the number posted by a group of indicators of the group inventory board may be decreased by a like amount and the new number posted by the indicators of the group inventory board concurrently with the posting of the remainder on the indicators of the individual inventory board, a single keyset operation being sufficient for accomplishing this result.

It will be noted that the operation of the system in subtracting a first number as, for example, the number 12 from a second number such as the number 03564 in the example just described, the answer 03552 is obtained by adding the number 99988 to the second number 03564, the last five significant digits of the remainder appearing on the five indicator units provided for this purpose being 03552. The number 99988 employed for this addition is obtained by subtracting the number 12 from the digits 9 9 9 9 and 10 in the ten-thousandths, thousandths, hundreds, tens and units places respectively.

The series contacts, such as contacts 148 of the digit keys TTH1 to TTH9 are effective to complete a circuit from the break contact and armature 66 of relay C9 by way of conductor 2 of cable 69 extending to the make contact of relay SUB associated with armature 149 whereby, if no ten-thousandths key is operated and relay SUB is operated, nine impulses are transmitted by way of armature 149 of relay SUB thereby adding the digit 9 to the ten-thousandths digit posted by the selected group of indicators. In a similar manner, the break contact of armature 66 of relay C9 is connected to a chain circuit of contacts of each of the thousandths, hundreds and tens keys of the keyset whereby, with relay SUB operated, nine impulses are transmitted to the indicators having the same denominational value as the value of the unoperated group of keys such, for example, as the TTH, TH and H digit keys when a number comprising tens and units digits only is to be subtracted. The operation of the digit key T1 closes a circuit from the break contact and armature 66 of relay C8 at contacts 132 of key T1, conductor 8 of cable 69, make contact and armature 78 of relay SUB whereby eight impulses are transmitted to the tens digit indicators when a subtraction operation comprising the tens digit 1 is to be effected and interrupts the chain circuit of key contacts comprising keys T1 to T9. In a similar manner the operation of the units digit key U1 closes a circuit from the break contact and armature 66 of relay C9 by way of conductor 10 of cable 69, make contact and armature 71 of relay SUB whereby the digit 9 is added to the digit posted by the units indicators, this being the equivalent of subtracting the digit 1 from the units digit of the number.

When the number to be subtracted comprises the units digit 0, no key is operated in the units key group U1 to U9 and a circuit is completed from battery at armature 64 and make contact of relay PP, conductor 65, armature 66 and break contact of relay C10, conductor 10 of cable 67, break contacts 140 of keys U1 to U9 in series, conductor 10 of cable 69, make contact and armature 71 of relay SUB, conductor 72, armature 73 and make contact of relay R, conductor 74 thereby applying ten actuating impulses to the units indicator of each of the selected groups. A carry over impulse is thus caused to be applied to the associated tens indicators to enable the correct remainder to be posted by the selected indicators.

*Operation of wipe-out*

When it is desired to wipe out the numbers displayed by the groups of indicators on the individual and group inventory boards as, for example, when the stock of certain of the items is discontinued or reclassified, the operator sets the group switches to the required positions and operates the desired selection keys, depressing the wipeout key WO after the operation of each of the selection keys. The operation of the selection key causes a gang relay such as relay GA to operate and, provided the associated group switch is set on position 1, the operation of the selection key also operates a group relay such as relay G1.

The operation of key WO applies ground to conductor 44 thereby causing the start relay ST to operate and lock to ground at the break contact and armature 46 of relay RLS. The operation of key WO at its contact 295 applies ground to the conductor 206 and thence to the winding of the wipeout relay WO, causing relay WO to operate and at its make contact and armature 207 lock to ground at the break contact and armature 46 of relay RLS.

The operation of relay ST at its armature 47 applies battery to impulse contacts B and C, battery being removed from contact A at armature 51 of relay WO. The operation of relay R in response to the repeated closure of cam C contacts causes ten impulses to be transmitted to the selected indicators over circuits including their contacts 76 and switching mechanism, thereby stepping the indicators ahead to their blank positions. As each indicator moves from its position 9 to its blank position, the switching mechanism thereof is disengaged from contact 78 and brought into engagement with its contact 101, thereby rendering the indicator unit unresponsive to additional operations, if any, of relay R. The indicator units are prevented from moving from their positions blank until ten impulses have been received and relay C10 operates. The operation of relay C10 at its armature 56 closes a circuit from battery at the make contact and armature 47 of relay ST, break contact and armature 48 of relay RLS, conductor 49, make contact and armature 53 of relay C10, conductor 52 and thence to the contacts of cam A. The operation of cam A with relay C10 operated, applies battery by way of conductor 54 to the windings of relays CO and CO1, causing relays CO and CO1 to operate and apply battery by way of contacts 101 and the switch elements of the selected indicators to the windings of the indicators thereby operating the indicators and causing them to be stepped ahead to their positions 0 as relays CO and CO1 release in response to the disengagement of the cam A contacts.

The operation of relays CO and CO1 causes the carry over relays to operate but the carry over relays do not lock for the reason that battery is removed from conductor 108 at armature 109 of relay WO. When relays CO and CO1 release battery is removed from the windings 1 of the carry over relays causing the carry over relays to release.

The closure of cam C applies battery to conductor 55, armature 56 and make contact of relay C10, conductor 113, armature 119 and break contact of relay EP1, break contact and armature 121 of relay L1, conductor 120, armature 204 and break contact of relay EP, break contact and armature 121 of relay L from whence the circuit continues by way of conductor 122, winding of the release relay RLS to ground, thereby causing relay RLS to operate and effect the release of the selection key A of the keyset and the counting chain relays. Relays WO and ST release as armature 46 of relay RLS moves away from its break contact, the release of relay ST at its armature 124 releasing relay RLS. The release of the selection key A releases the selected gang relays such as GA and GI thereby restoring to normal the transmitting and receiving apparatus, the indicators of the selected group now resting on their zero or normal positions.

*The error release feature*

An error key ER is provided to enable an operator to release any of the selection and price keys of the keyset which may have been depressed in error, provided the error is discovered prior to the operation of the start relay ST. When the error key is operated battery is applied to conductor 208, break contact and armature 209 of relay ST, conductor 122, winding of relay RLS and thence to ground, thereby operating relay RLS and causing ground at armature 96 and make contact of relay RLS to be applied by way of conductor 125 to the key release magnet KR of the keyset, thereby operating the key release magnet. The operation of the key release magnet causes the selection and price keys to be restored to their unoperated positions. The release of key ER removes battery from conductor 208 thereby releasing relay RLS and the key release magnet. The error key is rendered ineffective during the time that impulses are being transmitted to the selected indicators by interrupting the circuit from the winding of relay RLS to the contacts of the error key at armature 209 and break contact of relay ST.

While the invention has been described in detail with respect to a certain preferred example thereof which gives satisfactory results, it will be understood by those skilled in the art to which the invention pertains, after understanding the invention, that various modifications and changes may be made and various instrumentalities may be employed without departing from the spirit and scope of the invention, and it is intended, therefore, in the appended claims to cover all such changes, modifications and instrumentalities.

What is claimed as new and desired to be secured by Letters Patent of the United States is:

1. In a registering system of the character disclosed, a source of signals including selection signals and numerical signals representative of the digits of a number, receiving means comprising a plurality of groups of indicators for displaying the digits of numbers respectively in regard to different items, means responsive to said signals for actuating said indicators to cause them to display a number which is changed by an amount corresponding to the value of the digit signals received, switching means connected to said actuating means and operable in accordance with the settings of the indicators, a group of carry-over relays common to said plurality of groups of indicators, means responsive to said selection signals for operatively connecting the switching means to said carry-over relays, energizing means for applying potential to the windings of said carry-over relays at periodic intervals of time, means controlled by said switching means for causing said carry-over relays to operate concurrently with the associated indicators as potential is applied thereto by said energizing means, means for maintaining said carry-over relays in an operated condition, an impulse generating mechanism, a counting chain of relays operated by said impulse mechanism, and means controlled by said carry-over relays for causing the indicators of higher denominational order to be actuated by said impulse mechanism when said counting chain of relays has completed a cycle of operations.

2. In a system of the character disclosed for posting information regarding a plurality of items of different classifications which change in number, a transmitting keyboard comprising a plurality of groups of keys of different denominational values for setting up the digits of a number representing the degree of change in the number of items posted, receiving means comprising a plurality of impulsively actuated devices for posting the digits of a number, said devices each having a non-posting position in addition to the positions for displaying the digits of a number, means for selecting said devices for operation, means for generating actuating impulses for said devices, a counting chain of relays operated by said impulse generating means in timed relation with said posting devices, a chain of contacts effective when no key is operated in the group of keys of lowest denominational order for causing ten impulses to be applied to the posting device of lowest denominational order under control of said counting relays, means including other chains of contacts on the remaining unoperated digit keys of higher denominational order for causing nine impulses to be applied to the posting devices of higher denominational order under control of said counting relays, means including a subtraction key for rendering said chains of contacts effective as the counting relays operate, means for applying less than ten actuating impulses to said lowest denominational posting device by an amount corresponding to the value of the lowest denominational digit key operated, means for applying less than nine actuating impulses to the remaining posting devices of higher denominational order by an amount corresponding to the values of the remaining operated digit keys, and means including switching contacts controlled by the settings of said posting devices for applying an additional actuation impulse to certain of said posting devices which have passed through said non-posting position whereby the selected posting devices are actuated to positions corresponding to the numerical difference between the number previously posted by the devices and the number represented by the operated digit keys.

3. In a system of the character disclosed, means including impulse generating means for selectively transmitting actuating impulses representative of a number, a posting device comprising a plurality of indicators each having a plurality of indicia thereon and responsive to said actuating impulses for displaying the digits of a number and having a display position in addition to the positions bearing said indicia, switching means controlled by each of said indicators and operative whenever the indicator moves into said additional position, a second impulse generating means for generating additional indicator actuating impulses in interspersed relation with respect to the first-named actuating impulses, means including said switching means for transmitting an additional impulse from said second impulse generating means to actuate the indicator past its said additional display position, and means controlled by said additional impulse for generating a carry-over impulse for actuating the indicator of the next higher denominational order to effect a carry-over between said indicators.

4. In a system of the character disclosed, a group of adjacent electro-responsive display indicators selectively settable, in response to incoming signals representative of a number, to a plurality of different positions respectively for displaying a number representing the total of the number previously displayed and the number transmitted, and each settable to a non-posting display position, means responsive to said signals for generating a series of actuating impulses representative of the number transmitted, means for generating additional actuating impulses interspersed with the impulses of said series, means operative when each of said display indicators has reached its said non-posting display position for causing said additional actuating impulses to actuate the indicator past its non-posting position to a succeeding display position, means for generating carry-over impulses interspersed with said additional actuating impulses, means controlled by said additional actuating impulses for causing said carry-over impulses to actuate the indicator of the next higher denominational order whenever the adjacent indicator of lower denominational order has been actuated to said non-posting position, and means for insuring that the necessary number of said carry-over pulses is generated to complete all necessary carry-over operations between the adjacent indicators of different denominational order in said group.

HAROLD F. MAY.

REFERENCES CITED

The following references are of record in the file of this patent:

UNITED STATES PATENTS

| Number | Name | Date |
|---|---|---|
| 1,927,702 | Foss | Sept. 19, 1933 |
| 2,061,745 | Wadel | Nov. 24, 1936 |
| 2,096,429 | Johnstone | Oct. 19, 1937 |
| 2,176,934 | Smith | Oct. 24, 1939 |
| 2,164,956 | Smith | July 4, 1939 |
| 1,911,863 | Webner | May 30, 1933 |
| 2,176,932 | Smith | Oct. 24, 1939 |
| 2,176,933 | Smith | Oct. 24, 1939 |
| 2,344,885 | Kozma et al. | Mar. 31, 1944 |